(12) United States Patent
Becucci

(10) Patent No.: US 6,972,091 B2
(45) Date of Patent: Dec. 6, 2005

(54) ION EXCHANGE RESIN PLANT

(75) Inventor: Piero Becucci, Bolano (IT)

(73) Assignee: TM.E. S.p.A. - Termomeccanica Ecologia, La Spezia (IT)

( * ) Notice: Subject to any disclaimer, the term of this patent is extended or adjusted under 35 U.S.C. 154(b) by 0 days.

(21) Appl. No.: 10/346,785

(22) Filed: Jan. 17, 2003

(65) Prior Publication Data

US 2003/0136718 A1    Jul. 24, 2003

(30) Foreign Application Priority Data

Jan. 22, 2002  (IT) ................................ MI02A0106

(51) Int. Cl.[7] ............................................. B01D 23/24
(52) U.S. Cl. ...................... 210/275; 210/283; 210/284; 210/289; 210/291; 210/266; 210/285; 210/279; 210/290; 210/190; 210/670
(58) Field of Search ................................ 210/283, 289, 210/291, 266, 284, 285, 279, 290, 190, 275, 210/670

(56) References Cited

U.S. PATENT DOCUMENTS

| | | | | |
|---|---|---|---|---|
| 2,572,848 A | * | 10/1951 | Fitch ............................ | 521/26 |
| 2,666,741 A | * | 1/1954 | McMullen ..................... | 521/26 |
| 2,855,364 A | * | 10/1958 | Roberts ........................ | 210/678 |
| 3,335,868 A | * | 8/1967 | Schiffers ...................... | 210/274 |
| 3,382,169 A | * | 5/1968 | Thompson ................... | 210/673 |
| 3,497,069 A | * | 2/1970 | Winn et al. .................. | 210/282 |
| 3,554,377 A | * | 1/1971 | Miller .......................... | 210/275 |
| 3,617,558 A | * | 11/1971 | Jones ........................... | 210/677 |
| 3,719,591 A | * | 3/1973 | Crits ............................ | 210/675 |
| 3,813,333 A | * | 5/1974 | Plura ........................... | 210/676 |
| 3,846,298 A | * | 11/1974 | Plura ........................... | 521/26 |
| 4,233,158 A | * | 11/1980 | Wachsmuth ................. | 210/283 |
| 4,461,706 A | * | 7/1984 | Siegers ........................ | 210/275 |
| 4,519,917 A | * | 5/1985 | Martinola ..................... | 210/678 |
| 4,623,466 A | * | 11/1986 | Savall .......................... | 210/634 |
| 4,648,976 A | * | 3/1987 | Chen ........................... | 210/678 |
| 4,891,138 A | * | 1/1990 | Chonan et al. .............. | 210/675 |
| 5,955,510 A | * | 9/1999 | Wang ........................... | 521/26 |
| 6,387,271 B1 | * | 5/2002 | Geibel et al. ................ | 210/651 |
| 6,730,229 B1 | * | 5/2004 | Pandya ......................... | 210/670 |

FOREIGN PATENT DOCUMENTS

| | | |
|---|---|---|
| EP | 0 423 923 | 4/2001 |
| EP | 1 160 204 | 12/2001 |
| JP | 60 031831 | 2/1985 |
| WO | WO 94/13379 | 6/1994 |

OTHER PUBLICATIONS

EP Search Report.

\* cited by examiner

*Primary Examiner*—Duane Smith
*Assistant Examiner*—Minh-Chau T. Pham
(74) *Attorney, Agent, or Firm*—Hedman & Costigan, P.C.

(57) ABSTRACT

An ion exchange resin plant for the demineralizing or softening water with an arrangement that allows the plant to operate continuously. The plant tank is divided into to two separate compartments that work simultaneously. One compartment effects water demineralization while the other compartment regenerates the ion exchanging resins.

8 Claims, 3 Drawing Sheets

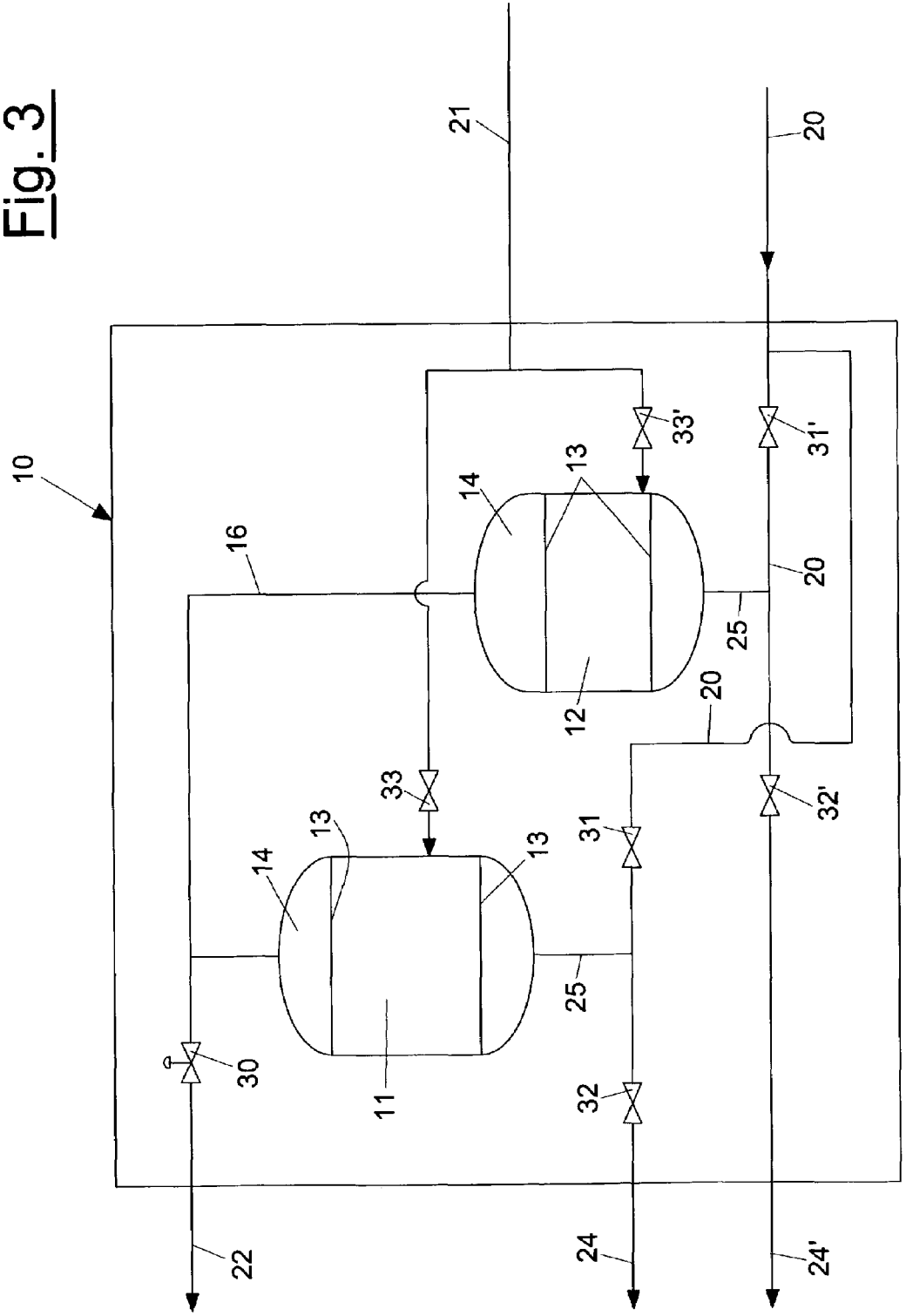

ION EXCHANGE RESIN PLANT

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

The present invention relates to an ion exchange resin plant.

BACKGROUND OF THE INVENTION

In particular, the invention relates to an ion exchange resin plant for the softening or demineralization of water for industrial use.

Ion exchange resins can be mainly divided into cationic resins if they contain negative ionized groups capable of exchanging cations, and anionic resins if they contain positive ionic groups capable of exchanging anions.

There are also amphoteric resins, i.e. which contain both anionic and cationic groups bound to the same lattice and resins of the selective type containing, for example, chelating or sequestering groups, capable of fixing particular ions.

Exchanging resins are generally produced in the form of spheroidal beads obtained by the polymerization or polycondensation of monomers in a non-solvent medium.

The exchanging resins immersed in aqueous solutions absorb water, solvate and are transformed into gels which behave like concentrated solid solutions and swell, due to the effect of osmotic pressure.

An ion exchange thus takes place according to an equilibrium reaction between two solutions with a different concentration.

The ion exchange technologies currently available for the softening or demineralization of water for industrial use, are characterized by a cyclic functioning, with two well distinct phases:

An appropriately defined production phase, during which treated water (demineralized or softened) is obtained with the desired characteristics.

A regeneration phase, during which the exchanging resins are treated so as to re-establish the characteristics in order to guarantee the necessary parameter values for the ion exchange to take place in the production phase.

This cyclic functioning generally characterized all exchange processes, those effecting regeneration by equicurrent or countercurrent circulation and those comprising beds consisting of exchanging resins of the compact or fluid type.

The cyclic functioning of ion exchange plants represents a considerable drawback in that, as almost always happens, a continuous availability of treated water is required.

A possible way of avoiding this disadvantage was to provide a storage tank having a sufficient capacity so as to cover at least the regeneration phase.

For precautional reasons, however, the tank is normally oversized to allow for the non-remote probability of having to repeat a regeneration cycle, if this proved to be not perfectly effective.

The exchanging bed must obviously also be oversized in order to cover, with a greater production, the consumptions of the regeneration phases.

An even more onerous solution, but which allows greater tranquillity, is to install two production lines, substantially identical, functioning in parallel, of which one is kept in production and the other effects a regeneration cycle subsequently remaining ready to be used as reserve.

When dimensioning the ion exchange beds, it should, in any case, be taken into account that, with the same productive capacity, the greater the quantity of resins forming the bed, the longer the interval is between two subsequent regenerations.

In order to have reasonably long regeneration intervals, it is therefore necessary to install large quantities of resins as during production, the ion exchange between water and resins only involves a small part of these.

If we imagine the bed as being subdivided into relatively thin successive layers, the exchange takes place and is completed in one layer, consisting of resins which are still intact, whereas the solution which arrives on the layer is deprived of the exchanged ion and in these conditions passes to the subsequent layer.

As the ion exchange reaction is in equilibrium, the concentration on the resin of the attached ion is at its maximum on the first layer and decreases in the subsequent ones.

As the resins become exhausted, the layer being used, in which the exchange takes place, becomes more distant from the inlet zone of the bed.

The production phase must be interrupted, in order to pass to the regeneration, when the layer of resins to be used for the ion exchange has become so thin that it can no longer guarantee the desired characteristics of the water.

With this operating procedure, there is therefore a much greater quantity of resins installed than that technically necessary for completing the ion exchange.

One of the disadvantages of these types of plant is associated with the high immobilization of capital, caused by the large dimensions of the components and high quantities of resins necessary for forming the bed.

Another drawback of the known plants is due to the high operating cost, as a result of the pressure drops to which the stream of water to be purified is subjected while crossing the resin beds, of which only a part, at a certain moment, participates in the process.

Attempts have been made in the past to overcome the above disadvantages by the use of different types of plants and processes.

The criterion mainly followed was to produce plants equipped with separate chambers reserved for the regeneration.

Similar solutions had the disadvantage of requiring a transfer of the resins from one chamber to the other, by introducing moving systems which ended up in inducing their precocious wear.

The plants of the known art also involve enormous production and maintenance costs as they use up considerable quantities of resin installed in relation to the minimum expected duration for the regeneration cycle.

BRIEF SUMMARY OF THE INVENTION

A first objective of the present invention is therefore to produce an ion exchange resin plant suitable for overcoming the above drawbacks of the known art.

Another objective of the present invention is to provide a plant with a limited encumbrance, having the same production, which is compact and also having, according to the specific necessities, a development substantially in height or substantially in width.

A further objective of the present invention is to provide a plant which has great running simplicity and reliability, due to the possibility of effecting the regeneration on a relatively limited number of valves.

The plant according to the present invention advantageously allows the efficiency of the resin exchange to be maximized by adapting the duration of the production phase to the variations in salinity of the water at the inlet.

With the plant of the invention, it is also advantageously possible to separate the production of the cationic step from that of the anionic step, thus avoiding the addition of reagents for the neutralization of the eluants.

These objectives and advantages according to the present invention are achieved by constructing a plant as described in the independent claims 1 and 6.

Further characteristics of the plant according to the invention are the object of the dependent claims.

The ion exchange resin plant according to the invention comprises a tank divided into two separate compartments, a first compartment and a second compartment, containing the exchanging resins, said first and second compartments being arranged so as to allow the plant to operate in continuous so that when one compartment is effecting water purification, the other compartment is regenerating the exchanging resins.

The characteristics and advantages of the plant according to the present invention will appear more evident from the following illustrative but non-limiting description, referring to the enclosed schematic drawings in which:

BRIEF DESCRIPTION OF THE DRAWINGS

FIG. 3 represents a purification plant according to a second variation of the embodiment of the invention;

DETAILED DESCRIPTION OF THE INVENTION

Figure 1:
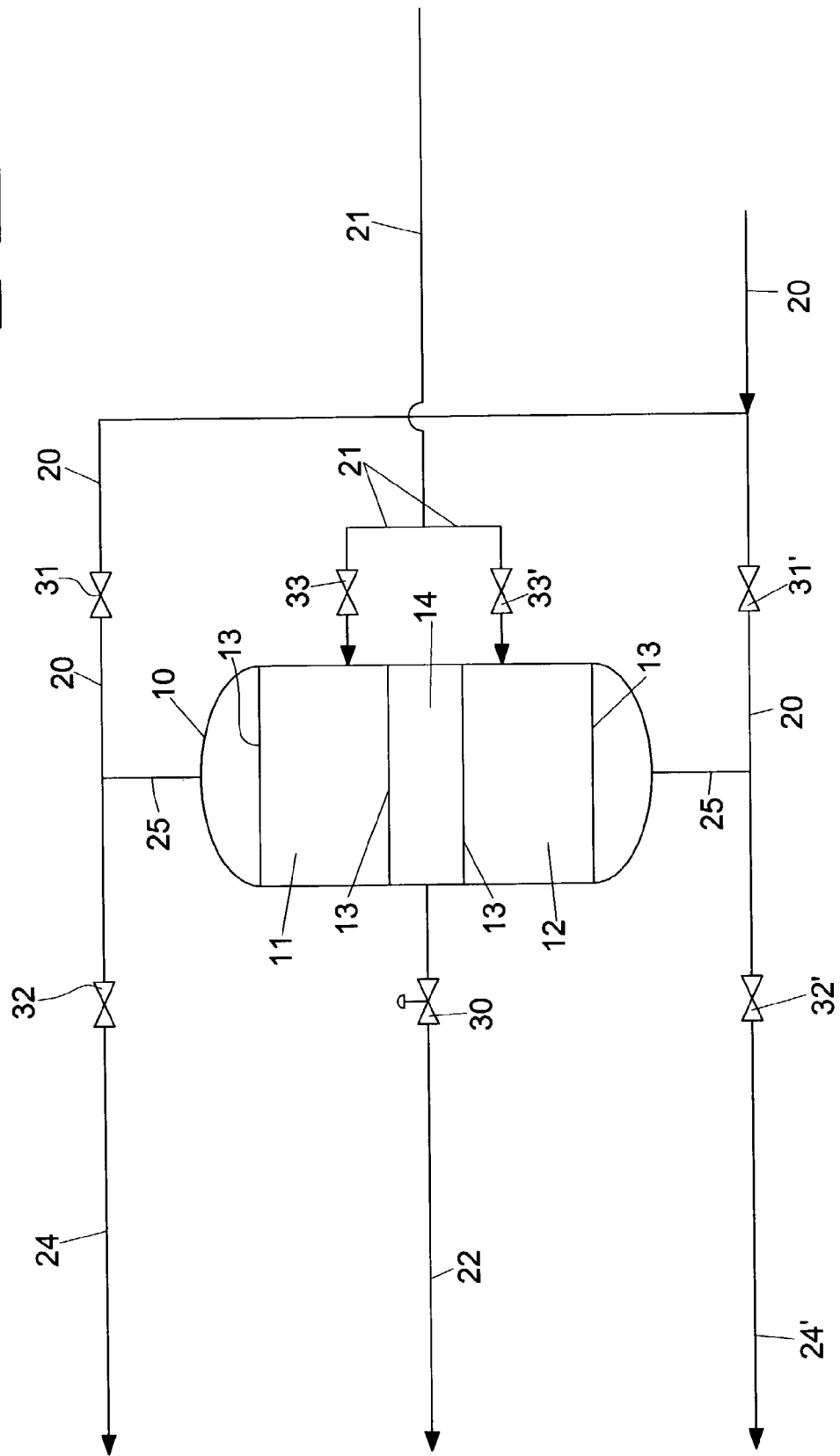
FIG. 1 schematically represents a purification plant according to the invention.

With reference to the FIG. 1, an ion exchange resin plant, in particular for the purification of water, comprises a tank 10 divided into two compartments, a first compartment 11 and a second compartment 12 containing the exchanging resins.

The first and second compartment 11, 12 are separated from each other by nozzle-holder plates 13, suitable for supporting the exchanging resins arranged on beds of the compact or fluidized type.

Said nozzle-holder plates 13 also distribute and collect the circulating water.

Between said first and second compartment 11, 12, there is therefore a chamber 14 in which the purified water is collected, which can subsequently be sent out of the plant through an exit line 22 regulated by an outlet valve 30.

Said valve 30 is preferably an automatic regulation valve, driven by a flow-rate signal.

Each of said first and second compartments 11, 12 is fed with water to be purified, through a feeding line 20 respectively controlled by a first feeding valve 31 for the first compartment 11 and a second feeding valve 31' for the second compartment 12.

Each of said first and second compartments 11, 12 is also equipped with a reagent line 21 intercepted by a pair of entry valves 33, 33' to regulate the feeding of the regeneration reagent to the first compartment 11 and the second compartment 12, respectively.

Each of said first and second compartments 11, 12 is also equipped with a discharge line of the regeneration water, the first compartment 11 being equipped with a discharge line 24, whereas the second compartment 12 is equipped with a discharge line 24'.

Said discharge lines 24 and 24' are intercepted by corresponding discharge valves 32, 32' suitable for regulating the discharge of the regeneration water from the first compartment 11 and the second compartment 12, respectively.

Said valves 31, 31', and 32, 32' are respectively situated upstream and downstream of the inlet block 25 of the feeding line 20 and outlet block of the discharge lines 24 and 24' into and from each compartment 11, 12 of the tank 10.

In this respect, it should be noted that depending on the functioning procedure of the plant, water to be purified coming from the feeding line 20 or the regeneration water coming, each specific time, from the compartment 11 or 12 on which is effecting said regeneration, can alternatively pass through the block 25.

The plant is consequently capable of instantaneously and continuously producing the required quantity of treated water (demineralized or softened), using a very limited quantity of resin.

This plant embodiment thus allows the quantity of resins to be dimensioned, referring more to hydraulic rather than physico-chemical parameters, thus optimizing the layer of resin to the minimum value sufficient for guaranteeing the desired chemical characteristics of the water.

The functioning method of the ion exchange resin plant for the purification of water, or more specifically demineralization or softening of water for industrial use, operates using the ion exchange tank 10 subdivided into two compartments filled with the same resin.

When functioning, while one compartment is effecting the purification, the other is regenerating or is in standby.

If, for example, the purification is to be effected in compartment 11, valves 31 and 30 are opened and the desired flow-rate is obtained at the outlet of valve 30.

Contemporaneously compartment 12 effects the regeneration operating as follows:

the flow-rate at valve 31 is increased;

the flow-rate at the outlet through valve 30, is kept constant;

valve 32' is opened, so that the flow-rate of water necessary for effecting the regeneration of compartment 12 passes through it;

by acting on valve 33', the flow-rate of reagent necessary for the regeneration and completing the regeneration, is correctly dosed.

By means of an increased feeding from line 20, compartment 11 not only ensures the required water production, but also supplies the water necessary for the regeneration of the compartment 12.

At the end of the regeneration, the compartment 12 remains in standby.

Once the exchange effect of the resins present inside the compartment 11 is exhausted, without having to interrupt the production, compartment 12 is activated by opening valve 31' and closing valve 31.

Valve 30 remains open.

As soon as compartment 12 starts production, the regeneration of compartment 11 can be activated in exactly the same way as described for compartment 12:

the flow-rate is increased at valve 31';

the flow-rate at the outlet through valve 30, is kept constant;

valve 32 is opened, so that the flow-rate of water necessary for effecting the regeneration of compartment 11 passes through it;

by acting on valve 33, the flow-rate of reagent necessary for the regeneration is correctly dosed.

Compartment 12 not only ensures the required water production, but also supplies the water necessary for the regeneration of compartment 11.

At the end of the regeneration, compartment 11 remains in standby.

Figure 2:
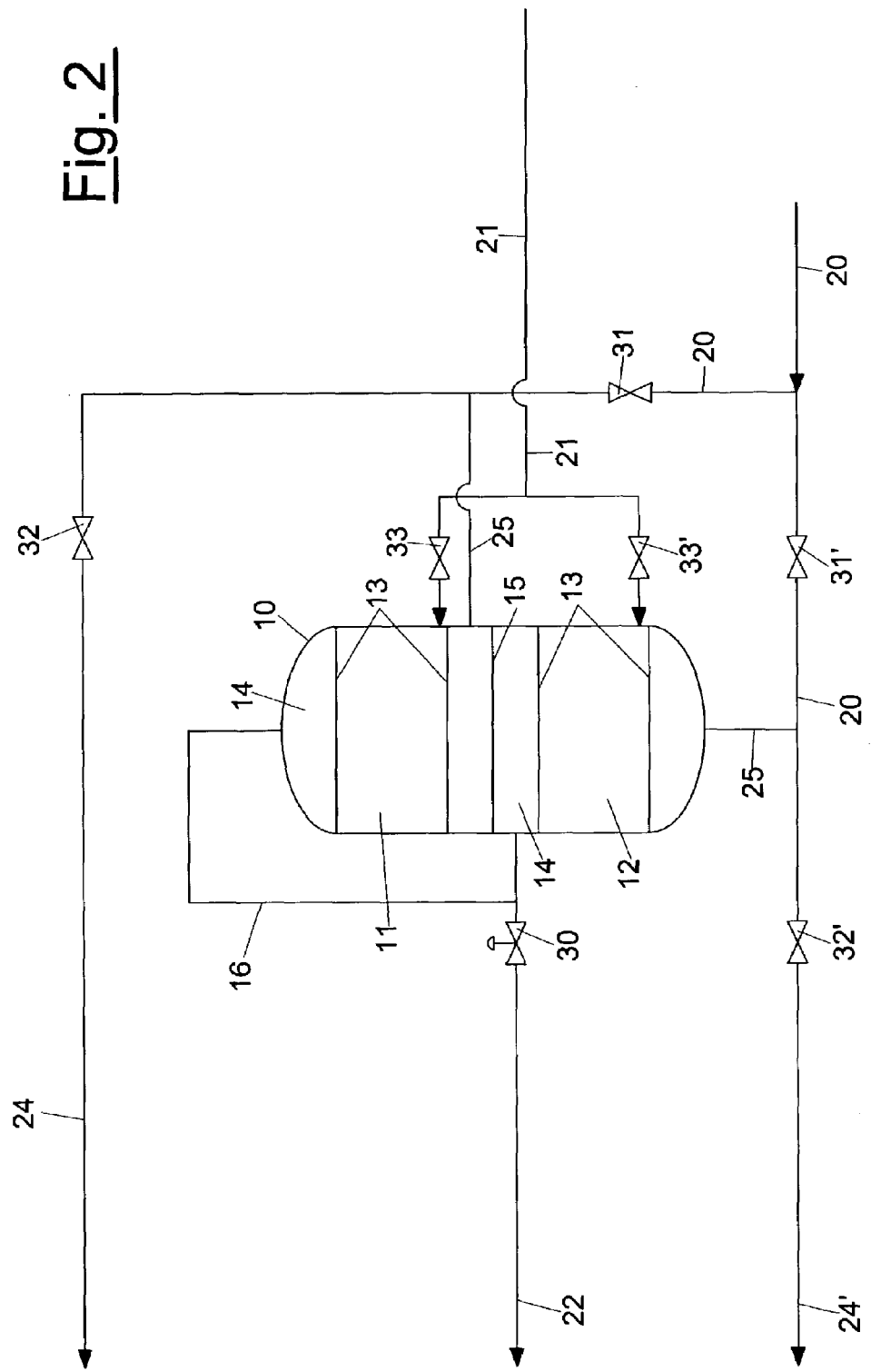
FIG. 2 represents a purification plant according to a first variation of the embodiment of the invention.

According to a different embodiment of the invention illustrated in FIG. 2, the tank 10 is divided into the two compartments 11, 12, physically separated by a septum 15, but connected through a duct 16, situated between line 22 and the upper portion of the first compartment 11.

Two chambers 14 are thus formed, each situated at the top of one compartment 11, 12, advantageously obtaining a regenerating stream from above, in order to make the regeneration operation uniform in the compartments, at the same time however maintaining a substantially vertical development of the plant.

Said two chambers 14 have the same functions as the single chamber 14, and the functioning of the plant is substantially the same, allowing the regeneration of one compartment effected by withdrawing a part of the treated water, i.e. demineralized or softened, supplied by the other compartment under production thanks to the connection between the two chambers 14 obtained by means of the duct 16.

FIG. 3 shows a second variation of the plant embodiment, which differs from the version of FIG. 2 in the type of development assigned to the plant.

In this second variation, in fact, the two compartments are separated but inserted side by side in the same tank 10, in order to obtain a substantially horizontal development.

This second embodiment variation also has two chambers 14, each of which is situated on top of the corresponding compartment 11 or 12 and has a connecting duct 16 between the two above chambers 14, through which the treated water coming from one of the two compartments under production and sent to the other compartment for regeneration, can flow in both directions.

In both of the above variations illustrated in FIGS. 2 and 3, the flow of water to be treated is therefore obtained, both for the first compartment 11 and the second compartment 12, from the bottom upwards towards the top, whereas the regeneration flow goes from the top downwards towards the bottom.

An improvement in the production capacity and running economy of the plant with respect to the plants according to the known technique, has been observed in the plants according to the invention.

Moreover, a further improvement has been verified in the plants according to the two above embodiment variations, with respect to the uniformity of the quality of the water produced.

What is claimed is:

1. An ion exchange resin plant comprising a tank (10) divided into two compartments, a first compartment (11) and a second compartment (12), containing ion exchange resins, said first and second compartments (11, 12) being separated from each other and having nozzle-holder plates (13) suitable for supporting said ion exchanging resins and distributing and collecting circulating water, said first and second compartment (11, 12) each having a chamber (14) for collecting purified water, said chamber (14) being situated on the top of each said first and second compartments and connected through a duct (16), said purified water being discharged from said plant (10) by means of an outlet line (22) regulated by an outlet valve (30) which is connected to said duct (16), said first and second compartments (11, 12) being fed with water to be purified through a feeding line (20) respectively, controlled by a first feeding valve (31) for said first compartment (11) and by a second feeding valve (31') for said second compartment (12), each of said first and second compartments (11, 12) being equipped with a reagent line (21) having an entry valve (33, 33') for regulating the feeding of a regeneration reagent to said first compartment (11) and to said second compartment (12) respectively, each of said first and second compartments (11, 12) also being equipped with a corresponding outlet line for regeneration water (24, 24') having a discharge valve (32, 32') suitable for regulating the discharge of said regeneration water from said first compartment (11) and from said second compartment (12) respectively and wherein said first and second compartments (11, 12) are separated from each other by a septum (15).

2. The ion exchange resin plant according to claim 1, wherein said first and second compartments (11, 12) are arranged with a substantially horizontal development.

3. The ion exchange resin plant according to claim 1, wherein said outlet valve (30) is an automatic regulation valve driven by a flow-rate signal.

4. The ion exchange resin plant according to claim 1, wherein said first and second compartments (11, 12) are arranged with a substantially vertical development.

5. The ion exchange resin plant according to claim 1, wherein said first and second compartments (11, 12) are arranged so as to allow said plant to operate continuously so that when one of said first or second compartments (11,12) is effecting purification of water, said other compartment is regenerating said ion exchange resins.

6. The ion exchange resin plant according to claim 5, wherein said first and second compartments are arranged with said feeding valve (31) and said outlet valve (30) and said discharge valve (32') opened to allow the contemporaneous purification of the water inside said first compartment (11) and regeneration of said ion exchanging resins of said second compartment (12).

7. The ion exchange resin plant according to claim 5, wherein said first and second compartments (11, 12) are arranged with said feeding valve (31') and said outlet valve (30) and said discharge valve (32) opened to allow the contemporaneous purification of water inside said second compartment (12) and regeneration of said ion exchange resins of said first compartment (11).

8. The ion exchange resin plant according to claim 1, wherein said first and second compartments (11, 12) are equipped with a block (25) which connects said feeding line (20) and said outlet line of regeneration water (24) to each of said first and second compartments (11, 12) so that water to be purified coming from said feeding line (20) or said regeneration water coming from said first or second compartment in which said regeneration of said ion exchange resins is being effected, passes through it, depending on the operating procedure of the relative compartment.

* * * * *